June 30, 1942.  C. A. ZYARA  2,287,852
BLOCKING APPARATUS
Filed April 21, 1941  3 Sheets-Sheet 1
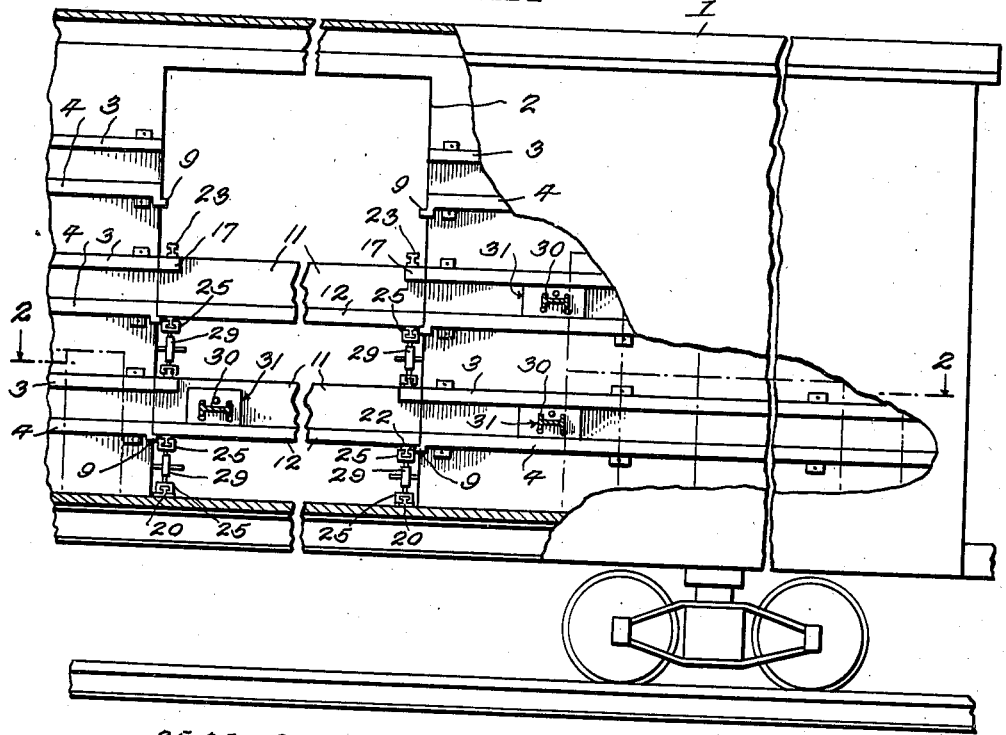
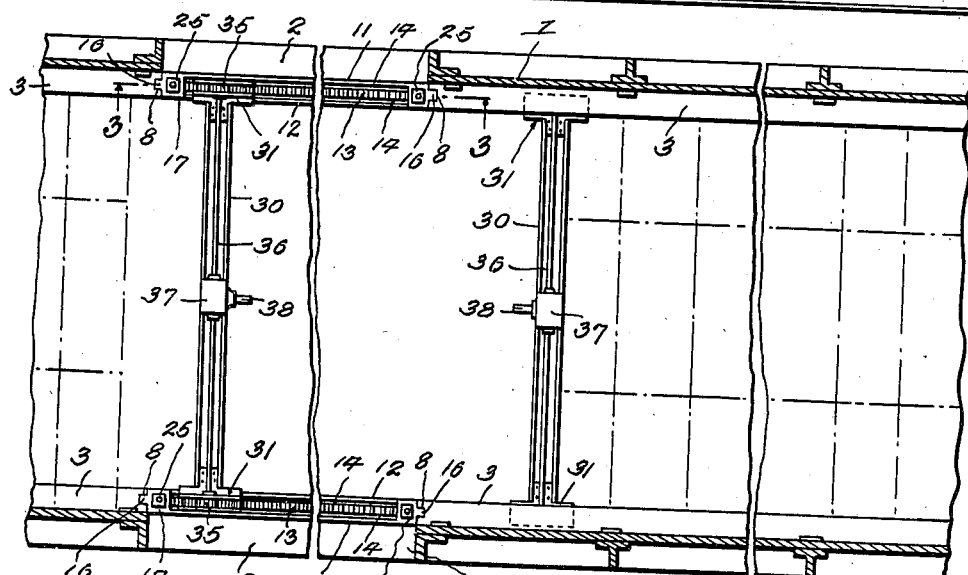
C. A. Zyara, INVENTOR.

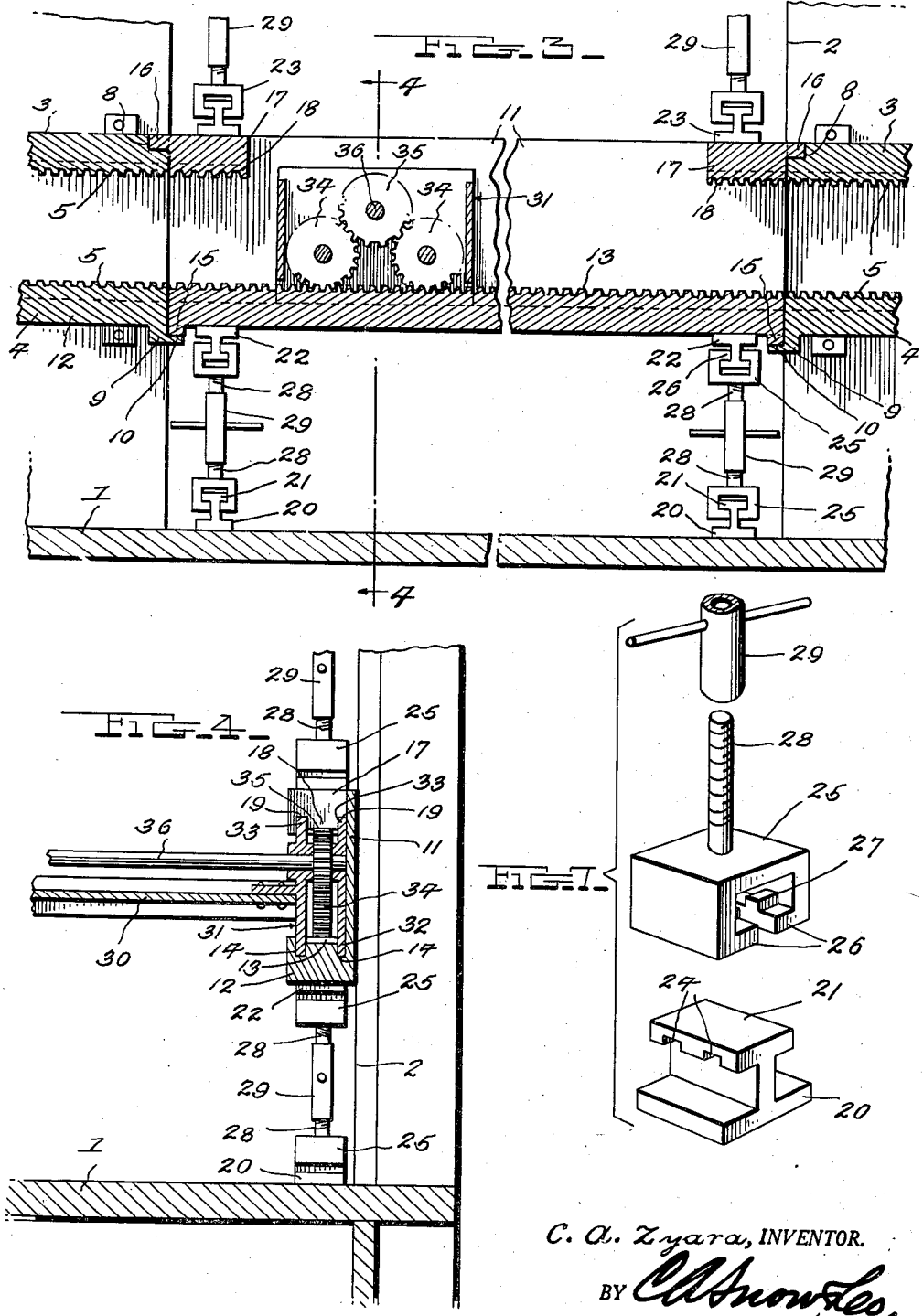

June 30, 1942.                C. A. ZYARA                2,287,852
                          BLOCKING APPARATUS
                        Filed April 21, 1941           3 Sheets-Sheet 3
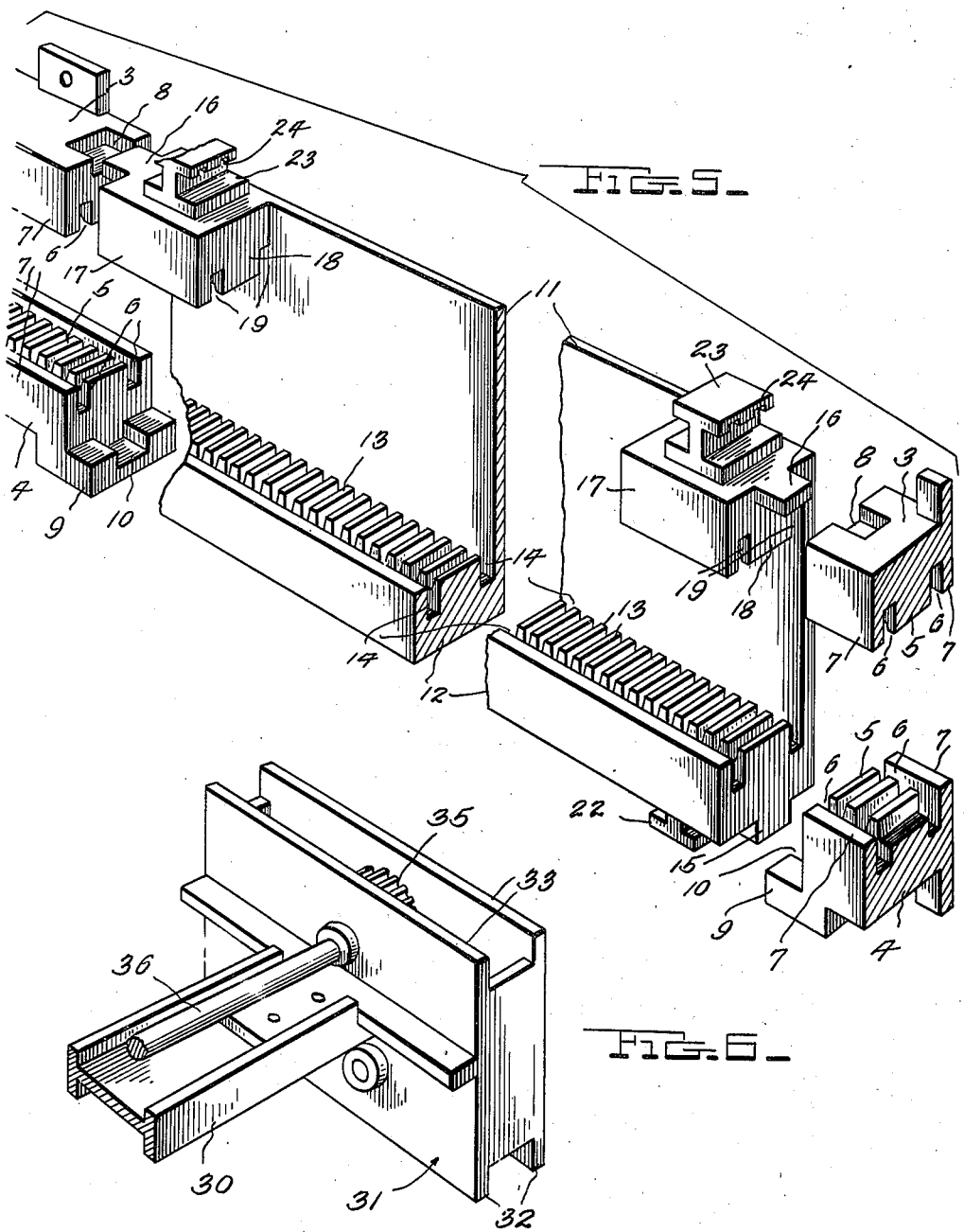
C. A. Zyara, INVENTOR.
BY Patented June 30, 1942

2,287,852

UNITED STATES PATENT OFFICE 2,287,852

BLOCKING APPARATUS

Charles A. Zyara, Whiting, Ind.

Application April 21, 1941, Serial No. 389,652

11 Claims. (Cl. 105—369)

This invention relates to apparatus designed primarily for holding freight against displacement in freight cars, ship holds, motor transport vehicles, etc.

It is a fact well known to those familiar with problems of transportation that considerable damage results from the accidental shifting of freight within car bodies, etc., this damage resulting not only in the necessity of paying claims to shippers but also frequently causing necessary outlays for repairs to equipment.

An object of the present invention is to provide blocking apparatus which can be built into or readily absorbed within a car and which, when in position, will hold the contents of the car securely in those positions in which they are placed.

A further object is to provide blocking apparatus which, after being once installed, eliminates the use of steel strapping, lumber, and other materials heretofore employed and which require the expenditure of considerable sums annually, thereby increasing the cost of shipments.

A still further object is to provide blocking apparatus which, when installed, constitutes a guard which protects the doors of the car from injury. It frequently happens that a shifting load will pile against one or both doors of a car and prevent it from being opened except by breaking some of the car structure. The present invention serves to eliminate this objectionable feature.

Another object is to avoid the necessity of nailing parts into the floor and sheathing of the car, as where lumber or the like is used for blocking purposes.

A still further object is to provide blocking apparatus which can be adjusted readily to meet the requirements of the load and to eliminate all objectionable features present where the usual methods of blocking are followed.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings—

Figure 1 is a view partly in side elevation and partly in section showing a portion of a freight car equipped with blocking apparatus such as constitutes the present invention, parts of the apparatus being broken away.

Figure 2 is a section on line 2—2, Figure 1.

Figure 3 is an enlarged section on line 3—3, Figure 2.

Figure 4 is a section on line 4—4, Figure 3.

Figure 5 is a perspective view of one of the removable blocking plates portions of which are broken away, said plate being shown adjacent to but out of engagement with its supporting means.

Figure 6 is a perspective view of one end portion of the cross-head of the apparatus.

Figure 7 is a perspective view showing the means employed for tying the blocking plate in position across a door opening.

Referring to the figures by characters of reference, 1 designates the body of a freight car although it is to be understood that the present improvements can also be installed in a motor transport vehicle, in a freight compartment of a vessel, or wherever stored material is likely to shift unless blocked. Therefore the term "vehicle body" herein used is to be construed as applying to any such structure.

The body 1 is provided with the usual door opening or openings 2 and extending in opposite directions from each door opening along the adjacent wall of the body are superposed pairs of rack bars 3 and 4, the teeth on the upper rack bar of each pair being provided on the bottom surface of the bar while the teeth on the lower rack bar of each pair are located on the upper surface thereof. The bars of each pair are alined with the corresponding bars of a pair of similar members located at the opposite side of the door opening and all of the bars are connected to the wall of the body in any suitable manner. They can be joined thereto by means of bolts or rivets or they can be welded in position. It is merely essential that the bars of each pair be fixed relative to each other and parallel.

Each of the bars 3 and 4 is provided with longitudinal grooves which extend across the ends of the teeth on the bar, these teeth, which have been indicated at 5, being thus spaced by the grooves 6 from the opposed faces of the bar so as to provide parallel guide flanges 7.

The bars 3 and 4 terminate at one end flush with the adjacent side wall of door opening 2 and they also extend preferably to the end walls of the car body 1. Those ends of the upper bar 3 which are adjacent the door opening are provided with recesses 8 in their top faces while extending from those ends of the bars 4 adjacent to the door opening 2 are downwardly offset lugs 9 each having a recess 10 in its upper surface.

Each door opening is adapted to be bridged by blocking plates 11 each of which is provided along the inner side of its lower edge, with a rack 12 the teeth 13 of which are spaced from plates 11 and from the opposite side of bar 12 by longitudinal channels or grooves 14. Each plate 11 is of such length as to be insertible between the opposed pairs of rails 3 and 4 and to extend close to the ends of said rails. When the plate 11 is thus located, the ends of the bar 12 will rest on the lugs 9 which thus provide seats and keys 15, depending from the ends of bar 12, will be seated in the recesses 10. At the same time keys 16 projecting from upper corner blocks 17 on plate 11 will be seated in the recesses 8. These corner blocks 17 are spaced apart but they are provided, on their bottom faces, with short racks 18 interposed between grooves or channels 19. The parts are so proportioned that when one of the blocking plates is positioned across the door opening 2 and between two opposed pairs of racks 3 and 4, the rack 12 will constitute, in effect, a continuation of the racks 4 while the racks 18 on the blocks 17 will constitute in effect continuations of the racks 3. The grooves or channels 14 will also register with the corresponding grooves or channels 6 and the grooves or channels 19 will register with the corresponding grooves or channels in the upper racks 3.

It is to be understood of course that separate blocking plates are to be arranged across the door opening, one of these plates being alined with each set of opposed pairs of racks 3 and 4 so that when they are properly placed, the plates will form, in effect, a protecting grille which serves to prevent a shifting load from coming into contact with and injuring or holding the door usually provided for the opening 2.

For the purpose of holding the blocking plates against upward displacement after they have been installed, anchoring blocks 20 having T-shaped heads 21 are welded, bolted or otherwise attached to the floor of the body 1 adjacent to the bottom of the door opening 2 and directly beneath the plates 11.

Similar blocks 22 are joined to and depend from the racks 12 adjacent to their ends while other blocks of the same construction, and which have been shown at 23 are mounted on and joined to the respective blocks 17. All of the blocks are so located that when one or more plates 11 are mounted across the door opening 2, the corresponding blocks 20, 22 and 23 will be in alinement. The head of each of the blocks is provided with one or more notches 24 as shown particularly in Figure 7 and, for the purpose of anchoring the plates 11 so that they cannot be lifted out of position accidentally, yokes 25 can be removably mounted in engagement with the head portion of the respective blocks. These yokes have inturned flanges 26 for lapping the heads, as shown and on the flanges are lugs 27 adapted to be seated in the notches in the heads. Each yoke has a screw-threaded stem 28 projecting therefrom and when yokes are placed in engagement with superposed alined heads, their stems will be extended toward each other. The threads on those stems 28 depending from yokes in engagement with the depending blocks 22, are pitched oppositely to the threads on the stems thereunder. Thus a turnbuckle 29 placed in engagement with the alined stems, can be rotated for the purpose of drawing the yokes toward each other. Obviously by interposing coupling devices between the blocks 20 and the blocks 22 and then turning the turnbuckles 29, the keys 15 and 16 carried by the lower plate 11 can be held fixedly in the respective recesses provided therefor and when other coupling devices are interposed between two plates 11, the upper plate will be similarly held in place through its connections with the plate thereunder. Thus it will be noted that the several blocking plates can readily be placed in position across a door opening as necessary and thereafter securely fastened.

There is provided, in connection with the racks, a cross-head comprising a beam 30 having a slide fixedly joined to each end thereof as shown at 31. Each slide is hollow and has parallel flanges 32 extending downwardly therefrom and parallel flanges 33 extending upwardly therefrom. The flanges are so proportioned and located as to be free to travel within the grooves or channels 6, 14 and 19. Spaced gears 34 are journalled in each slide and are positioned where they can mesh with the teeth of the racks 4 and 12. Both gears are in mesh with an intermediate gear 35 likewise journalled in the slide, this latter gear being so located where it can mesh with the teeth of the racks 3 and 18. The heads are of such width that they can be lowered readily between the blocks 17 on a plate 11 so as to bring the gears 34 into engagement with the teeth 13. The two slides are also so spaced as to be insertible readily with their connecting beam 30 between two opposed plates 11. Obviously when the cross-head is thus located, it can be caused to travel along the racks 12 and 4 and beneath the racks 3 and 18, the flanges 32 and 33, during this movement, being adapted to travel within the grooves or channels located across the ends of the rack teeth.

The gears 35 in the slides at the ends of the cross-beam 30 are secured to a shaft 36 which extends longitudinally of beam 30 and through a fixed gear housing 37 on the beam. This housing can contain suitable worm gearing, not shown, whereby motion may be transmitted from a stub shaft 38 to the shaft 36 simply by rotating shaft 38 with a hand-wheel, crank or the like.

In practice any desired number of cross-heads can be used in connection with each pair of opposed plates 11 and their associated racks. Where the apparatus is installed in a freight car it is the usual practice to provide two of these cross-heads with each pair of opposed plates 11.

These plates and their cross-heads are not placed in position until after one or both end portions of the car have been loaded with freight. After the loaded freight has been brought to points close to the sides of the door opening, the lower plates 11 are placed in position as heretofore explained and fastened down by the turnbuckles or couplings. The lower cross-head is then inserted through one of the door openings and lowered so as to bring the slides 31 in position on the respective racks 12. By then rotating shaft 38, this cross-head will be caused to feed along the racks 12 in one direction and then into position between the racks 3 and 4 until said cross-head is brought firmly against that portion of the load in the path thereof. Another cross-head can then be placed between the lower plates 11 and operated in a similar manner so as to feed in the opposite direction against that portion of the load in the path thereof. The space between these plates 11 and between the cross-heads can then be filled with merchandise or other freight after which the next pair of plates 11 are placed in position across the door opening and another cross-head positioned between them and on their racks 12. This operation is continued, cross-heads being positioned and shifted against the load until plates 11 and cross-heads have been brought to a desired elevation sufficient to properly hold the contents of the body against shifting. As each set of plates is positioned, the space between them and between the cross-heads can be filled with material to be transported. Following the loading of the body the doors can be closed and obviously the plates 11 will serve to protect the doors from becoming jammed or broken by any shifting load.

When the body is to be unloaded the foregoing operation is reversed.

Obviously the number of blocking plates and cross-heads used will depend largely upon the nature of the freight to be transported.

What is claimed is:

1. The combination with a transport body, of a pair of horizontal parallel racks secured to each side wall of the body, the said pairs of opposed racks being parallel and coplanar, there being a door opening in each side of the body providing a hiatus in the racks at each opening, a blocking member removably mounted across the door opening, a rack thereon alined with the intersected rack in the body, a cross-head proportioned for insertion through the door opening and downwardly in the body back of the member, rack-engaging gears adjacent to the ends of the cross-head, and means for simultaneously rotating the gears to move the cross-head along the racks.

2. The combination with a transport body, of a pair of horizontal parallel racks secured to each side wall of the body, the said pairs of opposed racks being parallel and coplanar, there being a door opening in each side of the body providing a hiatus in the racks at each opening, a blocking member removably mounted across the door opening, a rack thereon alined with the intersected rack in the body, a cross-head proportioned for insertion through the door opening and downwardly in the body back of the member, rack-engaging gears adjacent to the ends of the cross-head, means for simultaneously rotating the gears to move the cross-head along the racks, and detachable means for anchoring the member to the body against upward displacement.

3. The combination with a transport body, of a pair of horizontal parallel racks secured to each side wall of the body, the said pairs of opposed racks being parallel and coplanar, there being a door opening in each side of the body providing a hiatus in the racks at each opening, a blocking member removably mounted across the door opening, a rack thereon alined with the intersected rack in the body, cooperating means at the ends of the member and the intersected racks for supporting the member across the opening, a cross-head proportioned for insertion through the door opening and downwardly in the body back of the member, rack-engaging gears adjacent to the ends of the cross-head, and means for simultaneously rotating the gears to move the cross-head along the racks.

4. The combination with a transport body, of a pair of horizontal parallel racks secured to each side wall of the body, the said pairs of opposed racks being parallel and coplanar, there being a door opening in each side of the body providing a hiatus in the racks at each opening, a blocking member removably mounted across the door opening, a rack thereon alined with the intersected rack in the body, recessed portions at those ends of the intersected racks adjacent to the opening, keys carried by the member for engagement in said portions, a cross-head proportioned for insertion through the door opening and downwardly in the body back of the member, rack-engaging gears adjacent to the ends of the cross-head, and means for simultaneously rotating the gears to move the cross-head along the racks.

5. The combination with a transport body, of a pair of horizontal parallel racks secured to each side wall of the body, the said pairs of opposed racks being parallel and coplanar, there being a door opening in each side of the body providing a hiatus in the racks at each opening, a blocking member removably mounted across the door opening, a rack thereon alined with the intersected rack in the body, recessed portions at those ends of the intersected racks adjacent to the opening, keys carried by the member for engagement in said portions, a cross-head proportioned for insertion through the door opening and downwardly in the body back of the member, rack-engaging gears adjacent to the ends of the cross-head, means for simultaneously rotating the gears to move the cross-head along the racks, and detachable and adjustable means below the member for anchoring the member against withdrawal of the keys from the recessed portions.

6. The combination with a transport body, of a pair of horizontal parallel racks secured to each side wall of the body, the said pairs of opposed racks being parallel and coplanar, there being a door opening in each side of the body providing a hiatus in the racks at each opening, a blocking member having superposed racks, means for detachably supporting said member across the door opening with its racks in alinement with the adjacent racks in the body, a cross-head insertible into the body through the opening, rack-engaging gears carried by the end portions thereof, and gear-driving means on the cross-head for simultaneously actuating the gears to shift the cross-head longitudinally of the racks.

7. The combination with a transport body having door openings, of a pair of horizontal parallel racks secured to each side wall of the body, the said pairs of opposed racks being parallel and coplanar, there being a door opening in each side of the body providing a hiatus in the racks at each opening, blocking members proportioned for insertion between opposed alined pairs of fixed racks, racks on the members positioned to register with said pairs of fixed racks, means on said members for detachably supporting them on the fixed racks and across the respective openings, a cross-head insertible through a door opening and between the members, gears carried by the end portions of the cross-head positioned to mesh with the upper and lower racks respectively, and means on the cross-head for simultaneously rotating the gears to shift the cross-head longitudinally of the racks.

8. The combination with a transport body having opposed door openings, of superposed spaced members detachably mounted across the openings and constituting door guards, a pair of horizontal parallel racks secured to each side wall of the body, the said pairs of opposed racks being parallel and coplanar, there being a door opening in each side of the body providing a hiatus in the racks at each opening, said racks being positioned for alinement with the racks on the members, cross-heads insertible through a door opening and between opposed members in the respective openings, gears carried by the end portions of the cross-heads and positioned for meshing with the upper and lower racks respectively, and means for actuating the gears.

9. The combination with a transport body having opposed door openings, and a pair of horizontal parallel racks secured to each side wall of the body, the said pairs of opposed racks being parallel and coplanar, there being a door opening in each side of the body providing a hiatus in the racks at each opening, of members detachably mounted across the openings, racks thereon alined with the fixed racks, and means insertible through one of the openings and into position between the members, said means including opposed pairs of meshing gears for operative engagement with the respective pairs of racks, said means being extended across the body and positioned to block a load in the body.

10. The combination with a transport body having opposed door openings, and a pair of horizontal parallel racks secured to each side wall of the body, the said pairs of opposed racks being parallel and coplanar, there being a door opening in each side of the body providing a hiatus in the racks at each opening, of members detachably mounted across the openings, racks thereon alined with the fixed racks, and means insertible through one of the openings and into position between the members for operative engagement with the racks, said means being extended across the body and positioned to block a load in the body, said means including a cross-member, slides at the ends thereof, meshing gears in the slides, and a driving connection between the gears in the two slides.

11. The combination with a transport body having opposed door openings, and a pair of horizontal parallel racks secured to each side wall of the body, the said pairs of opposed racks being parallel and coplanar, there being a door opening in each side of the body providing a hiatus in the racks at each opening, of members detachably mounted across the openings, racks thereon alined with the fixed racks, and means insertible through one of the openings and into position between the members for operative engagement with the racks, said means being extended across the body and positioned to block a load in the body, said means including a cross-member, slides at the ends thereof, meshing gears in the slides, and a driving connection between the gears in the two slides, there being flanges on the slides and flange-receiving grooves in the racks, said racks being arranged one above the other in pairs the upper racks being inverted and the slides proportioned to enter between the racks of the pairs.

CHARLES A. ZYARA.